(12) United States Patent
Kröger

(10) Patent No.: US 6,516,931 B2
(45) Date of Patent: Feb. 11, 2003

(54) FREEWHEEL CLUTCH

(75) Inventor: Peter Kröger, Hambach (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/840,381

(22) Filed: Apr. 23, 2001

(65) Prior Publication Data

US 2002/0014384 A1 Feb. 7, 2002

(30) Foreign Application Priority Data

Apr. 22, 2000 (DE) .......................... 100 19 989

(51) Int. Cl.[7] ............................... F16D 43/00
(52) U.S. Cl. .......................... 192/46; 192/64
(58) Field of Search ............... 192/46, 47, 64

(56) References Cited

U.S. PATENT DOCUMENTS

| | | | | |
|---|---|---|---|---|
| 2,799,183 A | | 7/1957 | Rhein ........................... 74/750 |
| 4,147,243 A | * | 4/1979 | Segawa et al. ........... 192/217.4 |
| 4,437,553 A | * | 3/1984 | Geisthoff ................... 188/82.1 |
| 4,593,799 A | * | 6/1986 | Ozaki ........................... 192/46 |
| 4,711,331 A | * | 12/1987 | Hoffmann ................. 192/46 |
| 5,020,648 A | * | 6/1991 | Bush et al. .............. 188/82.6 |
| 5,054,594 A | * | 10/1991 | Kampf et al. ............. 188/82.3 |
| 5,556,354 A | * | 9/1996 | Meier-Burkamp ........ 475/275 |
| 6,202,813 B1 | * | 3/2001 | Yahata et al. ............. 192/46 |
| 6,264,575 B1 | * | 7/2001 | Lim et al. .................. 192/64 |

FOREIGN PATENT DOCUMENTS

| | | | |
|---|---|---|---|
| DE | 1575963 | | 2/1970 |
| GB | 567312 | | 2/1945 |
| GB | 2 174 464 A | * | 11/1986 ........... F16D/41/24 |

* cited by examiner

Primary Examiner—Rodney H. Bonck
Assistant Examiner—David D. Le
(74) Attorney, Agent, or Firm—Milan Milosevic; Lisa Wunderlich

(57) ABSTRACT

A freewheel clutch includes detent pawls located between first and second clutch parts. The pawls are moved exclusively by control elements. As a result, the freewheel clutch does not need any spring elements to hold the pawls in place. The control elements are attached to a common actuating ring. The freewheel clutch can be very easily assembled, and only a small amount of force is required to move the pawls.

14 Claims, 4 Drawing Sheets

FREEWHEEL CLUTCH

BACKGROUND OF THE INVENTION

1. Field of the Invention

The invention relates to a freewheel clutch having first and second clutch parts, a detent pawl supported with freedom of movement on one of the clutch parts, a recess in the other of the clutch part to accept the detent pawl, and a control element for moving the pawl out of the recess and into a position remote from the recess.

2. Description of the Related Art

Freewheel clutches are used, for example, in the hubs of the running wheels of bicycles and are usually used to produce or to release a form-locking connection between the clutch parts as a function of the rotational direction of a driving clutch part relative to a driven clutch part.

A freewheel clutch of this type is described in, for example, EP 0 787 922 A2. This freewheel clutch has a radially inner clutch part and a radially outer clutch part which encloses the radially inner clutch part. Several pawls are arranged on the radially inner clutch part which are pretensioned in a radially outward direction by spring elements. A ring of recesses is provided in the radially outer clutch part. The pawls can be urged out of the recesses in the radially inward direction by a control mechanism with a driver which can be moved against the pawl. This design of the control mechanism has the advantage that the pawls are out of the recesses when the clutch parts are rotating in the direction in which no positive, form-locking connection is to be produced between them. This arrangement avoids the generation of unpleasant noise and minimizes the wear on the recesses and the pawls. A problem with this known freewheel clutch, however, is that the spring elements are difficult to install and to hold in place. In addition, very large forces are required to move the pawls against the force of the spring elements. Accordingly, only a few pawls are typically used in this design. The pawls and the recesses must therefore be very strong and are accordingly made of steel.

Another freewheel clutch in which the control element can be moved by frictional forces between a position in which the pawls are inside the recesses and a position in which the pawls are outside of the recesses is known from DE AS 1,575,963. In this device, all of the pawls are pretensioned by a single spring in the radially outward direction into the recesses. The problem with this device is that it is difficult to install the spring element and that high forces are required to move the pawls against the force of the spring.

SUMMARY OF THE INVENTION

It is an object of the present invention to design a freewheel clutch for a bicycle hub having first and second clutch parts, a detent pawl supported with freedom of movement on one of the clutch parts, a recess in the other of the clutch part to accept the detent pawl, and a control element for moving the pawl out of the recess and into a position remote from the recess such that it is very easy to install and that very small forces are sufficient to move the pawls.

The object of the present invention is met by a freewheel clutch having a second control element provided for moving the pawls into the recesses.

The use of the second control element in the present invention obviates the requirement for a spring element to move the pawls. Accordingly, there is no need for complicated holders and guides for the spring elements. The freewheel clutch according to the invention may thus be installed very easily and may also be produced at low cost. The elimination of the spring element allows the pawls to be moved by forces which are much smaller than those required in the known freewheel clutch. Furthermore, the present invention allows a large number of pawls to be used because only a small amount of force is required to move the pawls. When a positive, form-locking connection is present between the clutch parts, the forces which develop are therefore distributed over the large number of pawls and the walls of the recesses. In the most favorable case, the pawls and the recesses may be made of a light-weight material with a strength much less than that of steel such as aluminum or magnesium or their alloys.

In accordance with a further embodiment of the present invention, the pawls may be actuated by a simple design in that at least one of the control elements is connected to an auxiliary pawl element such that the auxiliary pawl element latches itself into a recess when the clutch parts rotate relative to each other in an intended direction.

The freewheel clutch according to the present invention may be operated quietly when at least one of the control elements is connected to an auxiliary friction element arranged to produce a friction-locking connection between the clutch parts. Since the present invention requires only a small amount of force to move the pawls, the design of the freewheel clutch according to the present invention requires very small frictional forces.

A further problem of the known freewheel clutch is that there are a very large number of individual components which makes assembly of the clutch difficult. Accordingly, it is very expensive to fabricate the known freewheel clutch. Fabrication of the freewheel clutch according to the present invention is simplified when the control elements and the auxiliary pawl element or the auxiliary friction element are mounted on an actuating ring, which is movable with respect to the clutch parts. In the simplest case, the components may simply be inserted into each other during the assembly process. Another advantage of this design is that the actuating ring and the pawls may be put together to form a preassembled unit, which is easily assembled with the first and second clutch parts during final assembly.

In a further embodiment of the present invention, the pawls are controlled by a design in which the auxiliary pawl element is held under pretension in the recess. Because only small forces are required to move the pawls, a large number of pawls can be moved by only one or two auxiliary pawl elements. As a result, unpleasant noise is minimized.

Noise during the movement of the clutch parts relative to each other may be further minimized according to a further embodiment in which the auxiliary friction element is held under pretension against the clutch part with the recesses.

In yet another embodiment, the auxiliary pawl element or the auxiliary friction element can be held reliably in its intended position by mounting the auxiliary pawl element or the auxiliary friction element on a spring element which projects from the actuating ring. This design also contributes to a further simplification of the process of assembling the freewheel clutch according to the present invention.

The spring element may be installed at a slight angle relative to a tangent to the clutch part with the recesses. As a result, the auxiliary pawl element or the auxiliary friction element transmits small forces in one of the relative directions of rotation of the clutch parts and transmits very large forces in the opposite direction of relative rotation. This ensures that, after the form-locking connection between the clutch parts has been released, the detent pawls will be able to move reliably and that only a small amount of friction energy will be produced.

The freewheel clutch according to the invention may be made compact by providing the recesses in the radially inner part of the clutch.

In yet a further embodiment of the present invention, known freewheel clutches may be converted with little mechanical effort to freewheel clutches according to the present invention when the recesses are in the radially outer clutch part.

The freewheel clutch according to the present invention can be designed easily as an axial freewheel when the pawl is allowed to move in the axial direction and when the recesses and the detent pawl face each other in the axial direction.

The freewheel clutch designed as a radial freewheel requires very small dimensions in the radial direction when the actuating ring is located axially next to the area of the clutch parts with the recesses and pawl and when the control elements project into the area of the clutch parts with the recesses and the pawl.

To further reduce the number of components of the freewheel clutch according to the present invention, the auxiliary pawl element may be designed as an integral part of the spring element which projects from the actuating ring.

The control elements may, for example, work together with the associated pawl via knee levers. Alternatively, the control elements and the pawl may be designed very simply and fabricated very easily by providing the pawl with two guide bevels for the control elements.

To achieve a further reduction in the number parts to be manufactured, it is helpful in accordance with another embodiment of the present invention to design the control elements as a common component which is moveable in a guide groove of the pawl.

BRIEF DESCRIPTION OF THE DRAWINGS

In the drawings.

In the drawings, wherein like reference characters denote similar elements throughout the several views.

DETAILED DESCRIPTION OF THE PRESENTLY PREFERRED EMBODIMENTS

Figure 1:
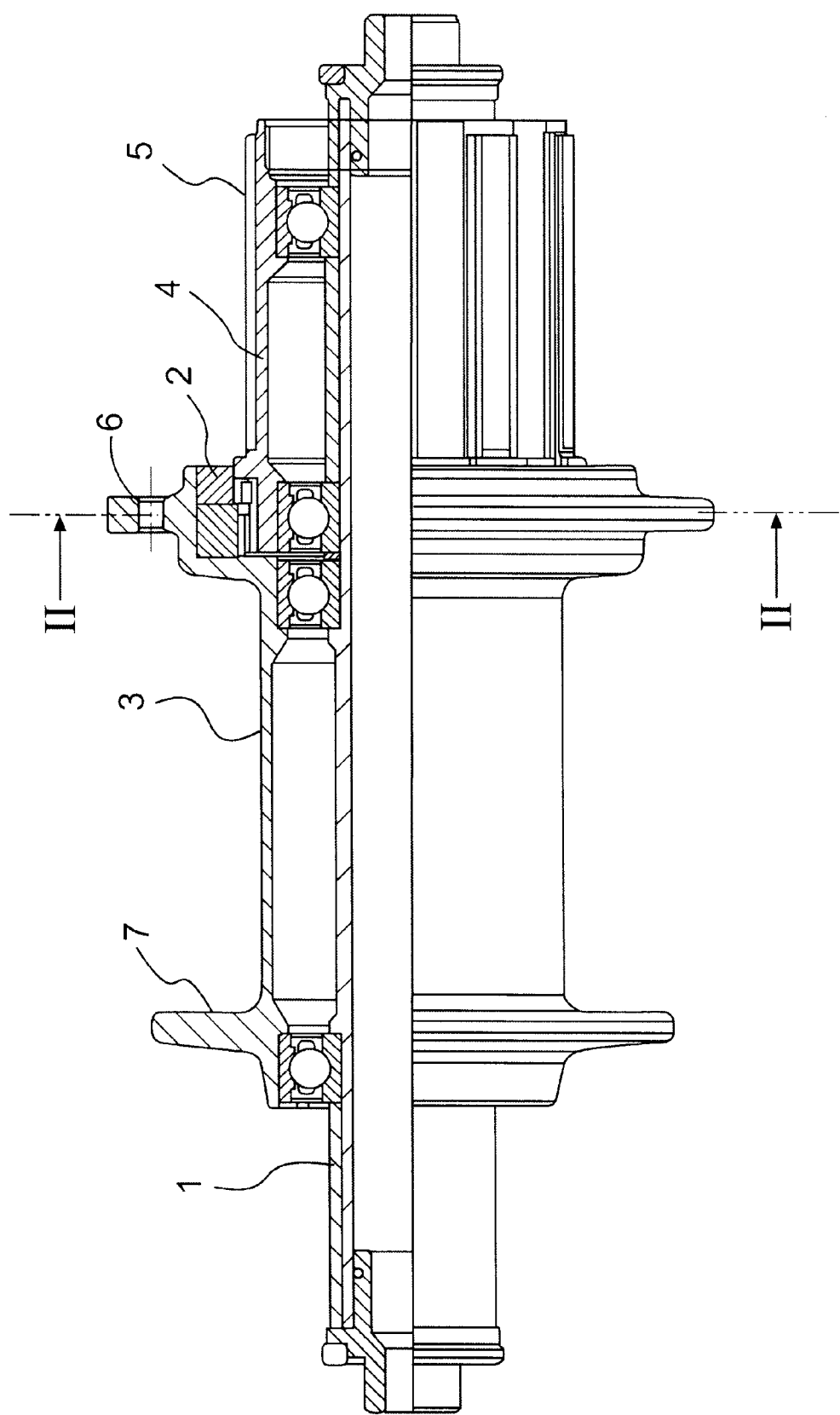
FIG. 1 is a partial cross sectional view of a hub of a bicycle with a freewheel clutch according to the present invention.

FIG. 1 shows a hub for a bicycle having an axle 1 and a freewheel clutch 2. The freewheel clutch 2 includes first and second clutch parts 3, 4 and has the function of selectively releasing and producing a positive, form-locking connection between the first and second clutch parts 3, 4 in response to the direction of their relative rotation. The first and second clutch parts 3, 4 are supported on bearings on the axle 1. The first clutch part 3 is designed as a hub sleeve and the second clutch part 4 is an integral part of a driver 5. The first clutch part 3 carries two spoke flanges 6, 7. In the areas where they are adjacent to each other, the first and second clutch parts 3, 4 enclose each other concentrically such that the first clutch part 3 is a radially outer one of the first and second clutch parts and the second clutch part 4 is a radially inner one of the first and second clutch parts.

Figure 2:
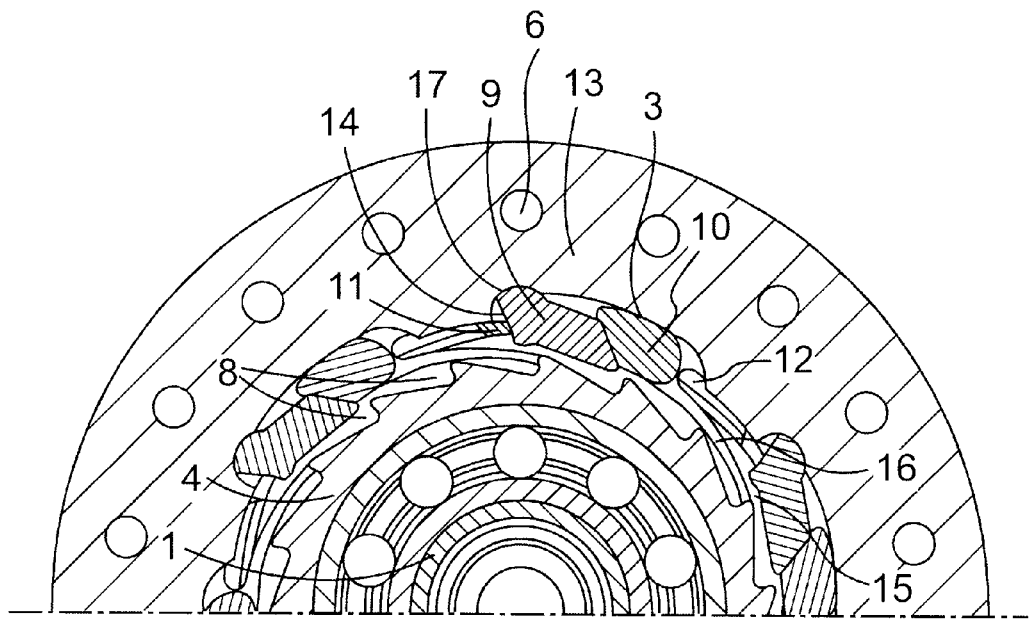
FIG. 2 is an enlarged cross-sectional view of the top half of the hub shown in FIG. 1, along line II—II.

FIG. 2 shows an enlarged cross-sectional view through half of the freewheel clutch 2 along line II—II of FIG. 1. The second clutch part 4 includes a ring of recesses 8. The first clutch part 3 supports several detent pawls 9. Two control elements 10, 11 are arranged at the ends of each pawl 9. These control elements 10, 11 are located on an actuating ring 12, concentrically surrounding the axle 1. The control elements 10, 11 respectively rest against guide bevels 13, 14 on the pawls 9. The actuating ring 12 can turn or rotate slightly with respect to the first and second clutch parts 3, 4 in the case of the freewheel clutch 2 shown here, designed as a radial freewheel. Auxiliary pawl elements 15 are integrally arranged with the actuating ring 12. Each of the auxiliary pawl elements 15 is pretensioned into one of the recesses 8 by a spring element 16 which is arranged at a small angle from the tangent of the actuating ring 12. In the position shown in FIG. 2, the detent pawls 9 are pretensioned radially outward by the control elements 11 which are close to the support points 17 of the pawls 9. The control elements 11 prevent the pawls 9 from moving freely when the second clutch part 4 rotates in the clockwise direction relative to the first clutch part 3 and thereby prevents the pawls 9 from generating noise during this state.

When the second clutch part 4 rotates in the clockwise direction relative to the first clutch part 3, the auxiliary pawl elements 15 are pressed radially outward. This configuration allows the second clutch part 4 to be rotated in the clockwise direction relative to the radially outer clutch part 3. However, when the second clutch part 4 rotates in the counter-clockwise direction relative to the first clutch part 3, the auxiliary pawl elements 15 engage in the recesses 8. As a result, the actuating ring 12 rotates slightly with respect to the first clutch part 3. The control elements 10 located at the free ends of the pawls 9 thus press the pawls 9 radially inward into the recesses 8 via the guide bevels 13. In this state, the support surface 17 of each pawl 9 is braced against the first clutch part 3. In this direction of relative rotation, a positive, form-locking connection is produced between the first and second clutch parts 3, 4.

Figure 3:
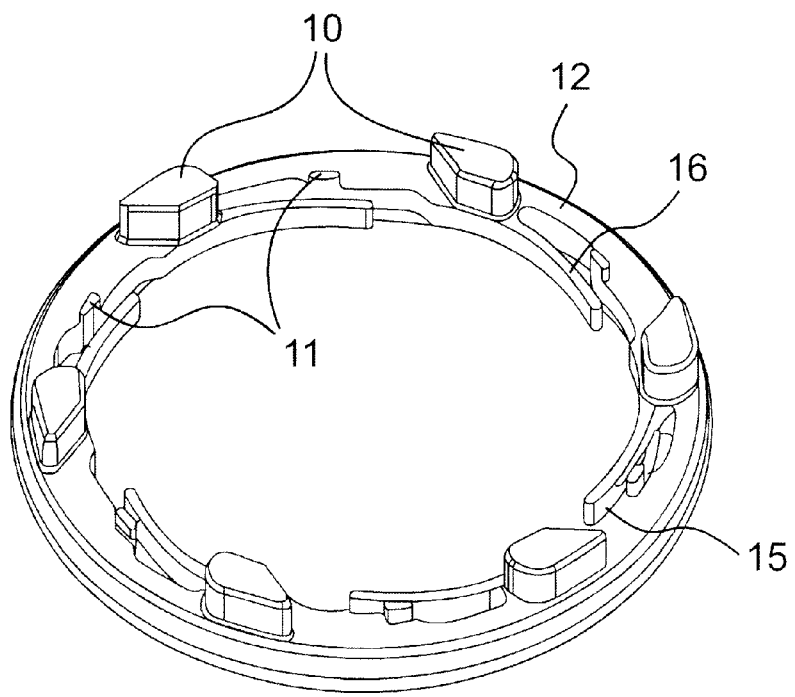
FIG. 3 is a perspective view of an actuating ring of the hub shown in FIG. 2.

FIG. 3 is a perspective view of the actuating ring 12 of FIG. 2 showing the projecting control elements 10, 11. The control elements 11 located near the support surfaces 17 of the pawls 9 in FIG. 2 are smaller than the control elements 10 located near the free end of the pawls 9. The number of spring elements 16 made as integral parts of the actuating ring 12 is equal here to the number of the pawls 9 provided for the freewheel clutch 2. Because only very small forces are required to move the actuating ring 12, it is often sufficient to provide a number of spring elements 16 that is smaller than the number of auxiliary pawl elements 15.

Figure 4:
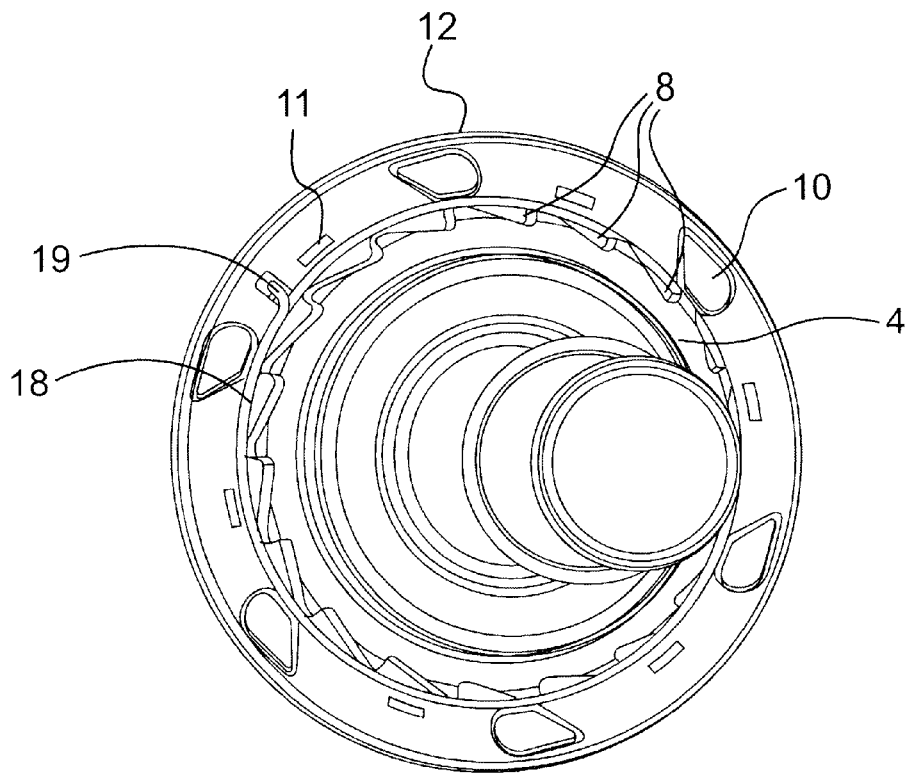
FIG. 4 shows a perspective view of an inner clutch part and an actuating ring according to another embodiment of the freewheel clutch of the present invention.
Figure 5:
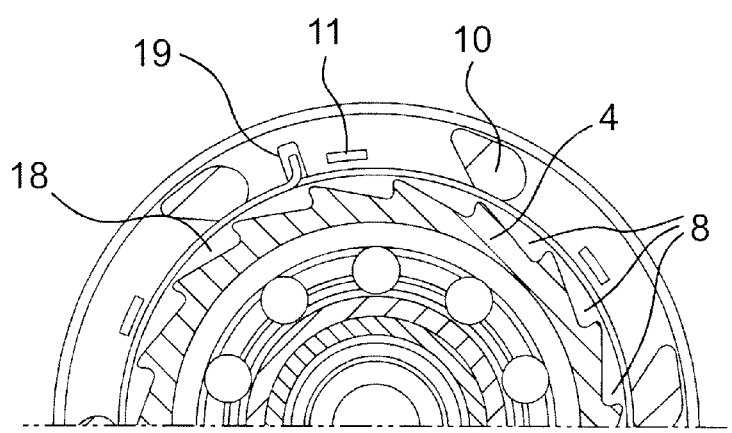
FIG. 5 is a cross-sectional view of the top half of the inner clutch part of FIG. 4.

FIG. 4 shows an embodiment of a freewheel clutch according to the present invention in which the actuating ring 12 has an auxiliary friction element 18. FIG. 5 shows a cross-sectional view of half of the assembly of this embodiment for the sake of clarity. To simplify the drawings of FIGS. 4 and 5, the pawls 9 shown in FIG. 2 and the first clutch part 3 have been omitted. The auxiliary friction element 18 is attached to the actuating ring 12 via a bent section 19 and rests against a section located axially next to the recesses 8 in the radially inner clutch part 4. The auxiliary friction element 18 includes a spring element extending around almost the entire circumference of the second clutch part 4 and has a predetermined coefficient of friction with respect to the second clutch part 4.

Upon rotation of the second clutch part 4 in the clockwise direction, the auxiliary friction element 18 is pressed radially outward and offers only slight resistance to any further rotation. Upon rotation of the second clutch part 4 in the counterclockwise direction, the auxiliary friction element 18 wraps around the radially inner clutch part 4 and the actuating ring 12 is carried along. The detent pawls 9 shown in FIG. 2 and supported on the first clutch part 3 then move in the same way as described in FIG. 2.

Figure 6:
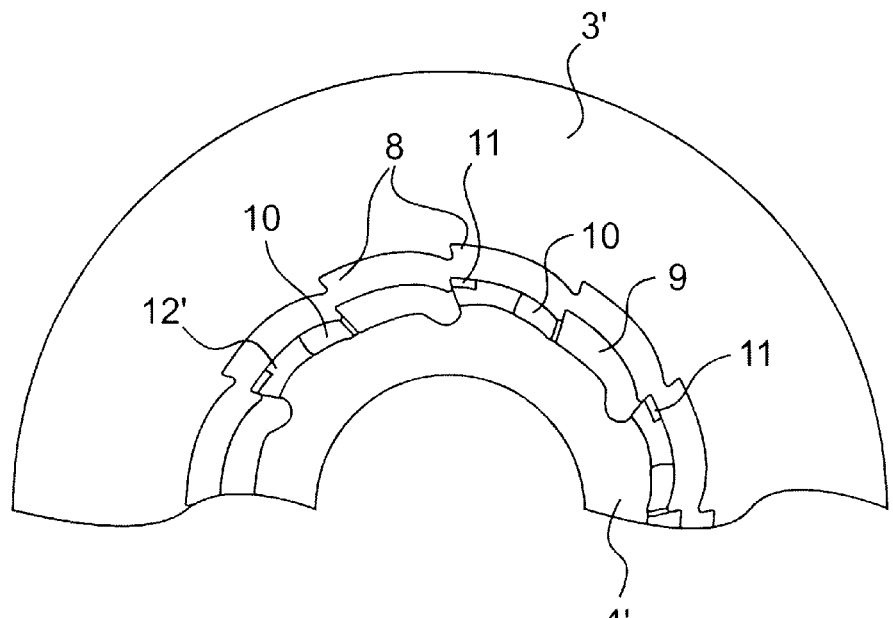
FIG. 6 is a sectional view of the top half of a freewheel clutch according to another embodiment of the present invention.

Instead of arranging the recesses 8 on the radially inner clutch part 4, the recesses 8 may also be arranged on a radially outer clutch part 3' as shown in FIG. 6. In this embodiment, the pawls 9 are supported on the radially inner clutch part 4'.

Figure 7:
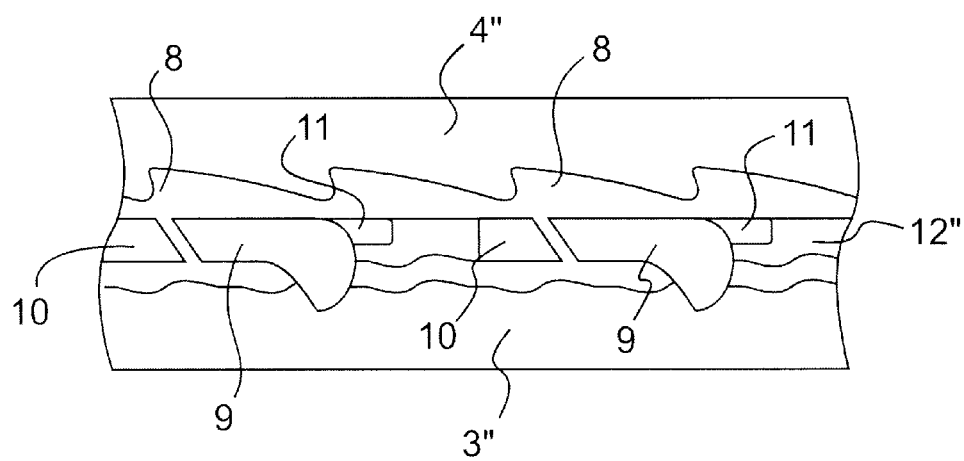
FIG. 7 is a view from the radial outer side of a freewheel clutch according to another embodiment of the present invention.

FIG. 7 is a view of a further embodiment of a freewheel clutch according to the present invention as viewed from a radially outer side. In this further embodiment, the pawls face the recesses axially instead of radially. The actuating ring 12" is arranged between the first and second clutch parts 3", 4" and radially inside of the pawls 9. Of course the activating ring 12" may also be arranged radially outside of the pawls 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A freewheel clutch, comprising:

a first clutch part rotatable about an axis of rotation;

a second clutch part rotatable relative to said first clutch part about said axis of rotation;

a movably supported detent pawl having a support surface supported on one of said first and second clutch parts and a free end being receivable in a recess arranged on the other of said first and second clutch parts;

a first control element arranged for moving said detent pawl out of said recess and into a position remote from said recess;

a second control element arranged for moving said detent pawl into said recess; and an auxiliary pawl engageable with the recess when said first and second clutch parts rotate relative to each other in a first direction for rotating the second control element to move said detent pawl into said recess.

2. The freewheel clutch of claim 1, wherein said auxiliary pawl element is pretensioned into said further recess.

3. The freewheel clutch of claim 1, wherein the other one of said first and second clutch parts comprises a radially inner one of said first and second clutch parts.

4. The freewheel clutch of claim 1, wherein the other one of said first and second clutch parts comprises a radially outer one of said first and second clutch parts.

5. The freewheel clutch of claim 1, wherein said detent pawl is movable in an axial direction and said recesses face said detent pawl in the axial direction.

6. The freewheel clutch of claim 1, wherein said first control element arranged for moving said detent pawl out of said recess, holding said detent pawl out of said recess, and preventing said detent pawl from engaging in said recess.

7. The freewheel clutch of claim 1, wherein said first and second control elements are designed as parts of a common part movable in a guide bevel in said detent pawl.

8. The freewheel clutch of claim 1, wherein said detent pawl has two guide bevels respectively arranged for interacting with said first and second control elements.

9. The freewheel clutch of claim 8, wherein said guide bevel corresponding to said second control element is proximal said support surface of said detent pawl.

10. The freewheel clutch of claim 1, further comprising an actuating ring movable relative to said first and second clutch parts, wherein said first and second control elements and said auxiliary pawl element are located on said actuating ring.

11. The freewheel clutch of claim 10, wherein said actuating ring is axially adjacent to an area of said first and second clutch parts having said recess and said detent pawl, said control elements projecting into the area of said first and second clutch parts having said recess and said detent pawl.

12. The freewheel clutch of claim 10, further comprising a spring element projecting from said actuating ring, said auxiliary pawl element being located on said spring element.

13. The freewheel clutch of claim 12, wherein said spring element is arranged at an angle from a tangent to the other of said first and second clutch parts.

14. The freewheel clutch of claim 12, wherein said auxiliary pawl element comprises an integral part of said spring element projecting from said actuating ring.

* * * * *